(No Model.)

C. C. BARTON.
APPARATUS FOR MAINTAINING A PROPORTIONAL FLOW OF LIQUIDS.

No. 371,166. Patented Oct. 11, 1887.

Witnesses:
J. M. Machellan
Stephen Alley

Inventor:
Charles C. Barton

UNITED STATES PATENT OFFICE.

UNITED STATES PATENT OFFICE.

CHARLES C. BARTON, OF NEW YORK, N. Y., ASSIGNOR OF ONE-HALF TO CHARLES AUGUSTUS KENNEY, OF LONDON, ENGLAND.

APPARATUS FOR MAINTAINING A PROPORTIONAL FLOW OF LIQUIDS.

SPECIFICATION forming part of Letters Patent No. 371,166, dated October 11, 1887.

Application filed October 5, 1886. Serial No. 215,398. (No model.)

*To all whom it may concern:*

Be it known that I, CHARLES CASIMIR BARTON, a citizen of the United States, a resident of New York, N. Y., and temporarily residing at St. Enoch's Hotel, Glasgow, Scotland, have invented a new and useful Improvement in the Method of and Apparatus for Regulating the Flow of Liquids, of which the following is a specification.

This invention relates to a method of and apparatus for regulating the flow of liquids.

The invention is intended more particularly for use in connection with water or other liquid-meters, but may be used with advantage for other purposes.

The invention consists in the method of regulating the flow through the main pipe by means of the flow through a smaller supplemental pipe connected therewith, and which, by means of the apparatus hereinafter described, automatically operates the regulating-valves of said main pipe.

To clearly explain my invention so that others skilled the art may practice the same, reference is made to the accompanying drawings, which form part of this specification, and in which—

Figure 3:
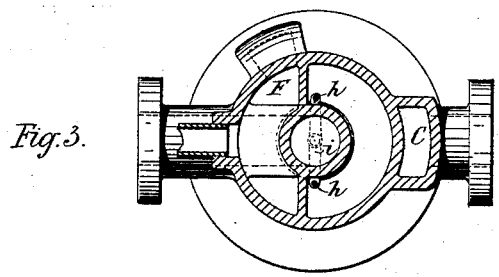
Figure 1:
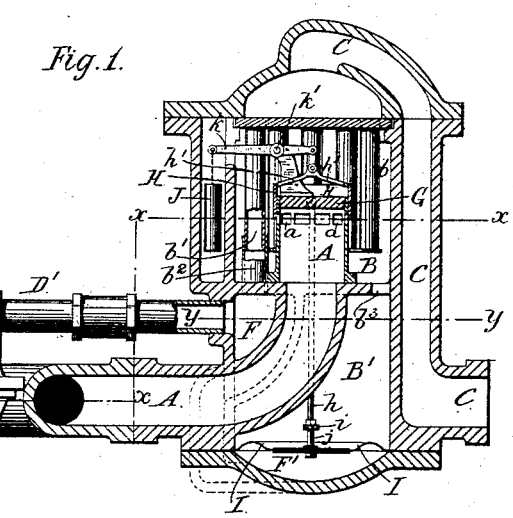
Figure 2:
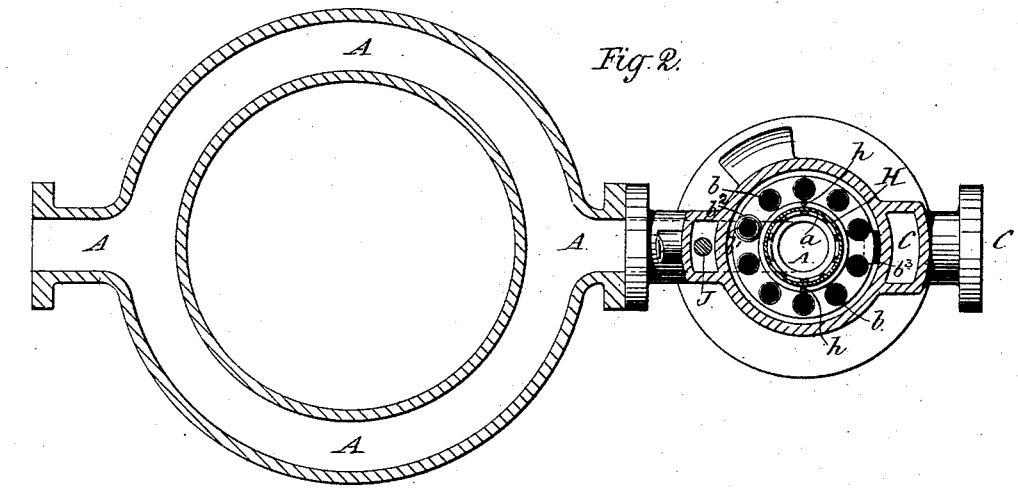

Figure 1 represents in elevation, partially in section, the arrangement of my invention when employed in conjunction with a liquid-meter. Fig. 2 is a plan view on the line $x\,x$, and Fig. 3 a plan view on line $y\,y$.

In said drawings, A represents the main pipe discharging through ports $a\,a$ into chamber B B′, and from thence to discharge C through pipes $b\,b$. The supplemental pipe D D′ is connected to pipe A and discharges through the meter E into chamber F F′, and from thence through pipe $b'$ to discharge C.

The main pipe A has a dead end, G, so that the liquid can only escape through ports $a\,a$, which are closed or opened by means of a cylindrical slide-valve, H, which makes but a loose fit, and is adapted to be raised or lowered by means of rods $h\,h$, carried thereon and attached at their lower ends to cross-bar $i$, which, by means of rod $j$, is connected to and operated by any movement of the flexible diaphragm I, which is in turn secured in the casing and forms a flexible division between chambers B′ and F′, so that any excess of pressure in either chamber will cause the said diaphragm I to rise or descend, and through the connected parts to open or close the ports $a\,a$ until an equilibrium of pressure is secured in chambers B B′ and F F′. The weight of connections $h\,h$, $i$, and $j$, as also that of slide-valve H, is counterbalanced by means of weight J, attached to lever $k$, pivoted at $k'$, and connected by arms $h'\,h'$ to slide-valve H.

In order to get the best results the pipes $b\,b$ should all be vertically placed and be of equal length and size, and should all be placed at points equidistant from the center of chamber B, and, together with pipe $b'$, equidistant from each other. Pipe $b'$ should also be of like size and similarly placed. The connecting-pipe $b^2$, between chamber F and pipe $b'$, is virtually part of said chamber, and is necessarily sightly larger than the pipe $b'$, as, if this were not so, with an equal pressure in chambers B and F, the discharge through $b'$ would be less than that through any one of the pipes $b$, owing to the increased resistance offered by pipe $b^2$ to the flow of the liquid from chamber F through pipe $b'$. The number of pipes $b\,b$ will depend upon the relative sizes of $b'$ and A. Thus, if the latter has an area of ten and the former of one, there should be nine pipes, $b$, each having an area of one, while pipes D′ and $b'$ carry the remaining tenth of the liquid, and, as this quantity must necessarily pass through the meter E and be measured, it will be at once evident that the total supply has been ten times that registered by the meter, or the indicating mechanism can be made to indicate ten times the volume absolutely passing through it, if so desired. It will be evident that this construction enables a small meter to be used for registering the flow in a large main.

I am aware that it is not new in an apparatus for registering the flow of water to divide the stream, causing the main body of water to pass into a chamber and act upon one side of a diaphragm, to which a regulating-valve is connected, and the smaller stream or body of water to pass through a meter and thence into a chamber, where it acts upon the opposite side of the said diaphragm; but in all such earlier devices of which I have knowledge the fluid passed into the common exit from the respective chambers through single orifices of different areas; hence to such devices has been incident a feature of unreliability, in view of the well-known principle of hydraulics that the proportionate amount of water passing through orifices of different areas varies with the pressure or aggregate flow. In order to overcome this difficulty and to insure that the amount passing through the smaller passage, in which is situated the meter, shall bear a fixed relation to the amount passing the unmetered portion of the passage, whatever may be the pressure or the aggregate flow, I have made this invention, for which protection is herein sought. To insure this, instead of passing the unmetered flow through a single large orifice, I pass it through a number of tubes each of a diameter and length equal to the diameter and length of the tube from the chamber F, the number of such tubes corresponding to the relative sizes of the pipes $b'$ and A. Each of the tubes leading into the exit-passage thus offers resistance to the passage of the fluid through it equal to that of each of the other tubes, which resistance, while varying with the pressure, varies equally in all, and the number of tubes being fixed, the relative amount of fluid passing through the main and supplemental pipes remains uniform. As it is necessary that the pressure at the inlet to each one of the tubes should be as nearly equal as possible, the tubes are preferably arranged equidistant from a common center (pipe A) and from each other.

While I consider the construction which I have shown the most advantageous, I do not wish to limit my invention thereto, as it will be understood that the main feature of my invention will be attained—that is, the maintaining a uniform relative flow through the main and supplemental pipes whatever be the pressure—even though simple apertures be used instead of tubes so long as the size and hence resistance of each orifice be the same.

The operation of the parts will be understood from the foregoing description; but it may be noted that should the pressure through pipe D′ cease for any reason the excess pressure which would immediately be found in B would be transmitted through opening $b^3$ into chamber B′, when diaphragm I would be depressed and slide-valve H drawn down, closing ports $a\ a$ and stopping the flow. This automatic closing of the discharge renders the regulator extremely useful as an adjunct to large water-mains, as by means of a small and readily-operated stop valve or cock placed in the supplemental pipe D the flow through a large main may be instantly shut off.

What I claim, and desire to secure by Letters Patent, is—

1. In an apparatus for maintaining a proportional flow of liquids, the combination, with the main and supplemental pipes, the discharge-chambers connected, respectively, with said pipes, a diaphragm separating said chambers, and mechanism operated by said diaphragm controlling the flow through the main pipe, of separate eduction-passages of uniform size and resistance opening from said chambers into a discharge, the number opening into each chamber being proportionate to the relative size of the main and supplemental pipes, substantially as described.

2. In an apparatus for maintaining a proportional flow of liquids, the combination, with the main and supplemental pipes, the discharge-chambers connected, respectively, with said pipes, a diaphragm separating said chambers, and mechanism operated by said diaphragm controlling the flow through the main pipe, of separate eduction-passages of uniform sizes and resistance opening from said chambers into a discharge, the number opening into each chamber being proportionate to the relative sizes of the main and supplemental pipes, and being arranged equidistant from a common center and from each other, substantially as described.

3. In an apparatus for maintaining a proportional flow of liquids, the combination of the main pipe, a discharge-chamber into which it opens, a series of tubes connecting said chamber with the discharge, the supplemental pipe in which is arranged a meter, a chamber into which said supplemental pipe opens, a tube connecting the last said chamber with the discharge, and being of a length and size the same as the tubes opening into the main discharge-chamber, a diaphragm separating said chambers, and a mechanism operated by said diaphragm for controlling the flow through said main pipe, substantially as described.

4. In an apparatus for maintaining a proportional flow of liquid, the combination of the main pipe A, chamber B B′, into which said pipe opens, supplemental pipe D′, chamber F F′, into which pipe D′ opens, a diaphragm separating said chambers, a valve operated by said diaphragm, controlling the passage of liquid through pipe A into chamber B B′, a series of tubes, $b\ b$, of uniform diameter and length arranged concentrically with pipe A and communicating between chamber B B′ and a discharge, and a tube, $b'$, of the same diameter and length as tubes $b$, and communicating between chamber F F′ and the discharge, substantially as described.

5. In an apparatus for maintaining a proportional flow of liquids, the combination, with the main and supplemental pipes, the chambers into which they respectively discharge, the tubes $b$, connecting the main chamber with the discharge-passage, the tube $b'$, of a diameter and length equal to tube $b$, opening into the discharge-passage, and the pipe $b^2$, connecting tube $b'$ with the supplemental chamber, it being of larger diameter than tube $b'$, whereby it offers less resistance to the liquid, substantially as described.

6. In an apparatus for maintaining a proportional flow of liquids, the combination, with the main and supplemental pipes, their respective discharge-chambers, and separate eduction-openings therefrom of uniform size, of means for maintaining an equal pressure in both said pipes, and a uniform proportionate flow through the same whatever the aggregate flow, substantially as described.

In witness whereof I have set my hand in the presence of two subscribing witnesses.

CHARLES C. BARTON.

Witnesses:
ALEX. D. YOUNG,
ROBERT WYLIE.